(12) United States Patent
Bretschneider

(10) Patent No.: US 12,130,464 B2
(45) Date of Patent: Oct. 29, 2024

(54) LUMINAIRE WITH LUMINOUS ELEMENT

(71) Applicant: QUARKSTAR LLC, Las Vegas, NV (US)

(72) Inventor: Eric Bretschneider, Corinth, TX (US)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 17/432,061

(22) PCT Filed: Feb. 21, 2020

(86) PCT No.: PCT/US2020/019254
§ 371 (c)(1),
(2) Date: Aug. 18, 2021

(87) PCT Pub. No.: WO2020/172548
PCT Pub. Date: Aug. 27, 2020

(65) Prior Publication Data
US 2022/0187527 A1 Jun. 16, 2022

Related U.S. Application Data

(60) Provisional application No. 62/809,535, filed on Feb. 22, 2019.

(51) Int. Cl.
*F21V 8/00* (2006.01)
*F21V 21/04* (2006.01)
*F21Y 115/10* (2016.01)

(52) U.S. Cl.
CPC ......... *G02B 6/0045* (2013.01); *G02B 6/0051* (2013.01); *F21V 21/04* (2013.01); *F21Y 2115/10* (2016.08)

(58) Field of Classification Search
CPC .. F21V 21/04; F21V 5/008; F21S 8/06; F21Y 2115/10; F21Y 2115/15; F21Y 2113/20; G02B 6/0045; G02B 6/0051; G02B 6/005
See application file for complete search history.

(56) References Cited

U.S. PATENT DOCUMENTS 5,810,463 A * 9/1998 Kawahara ............ G02B 6/0006
362/555
9,268,078 B2 * 2/2016 Schuch ................ G02B 6/4298
(Continued)

FOREIGN PATENT DOCUMENTS

| CA | 2961624 | 9/2018 |
|---|---|---|
| EP | 3330593 A1 | 6/2018 |
| WO | WO2014126886 A1 | 8/2014 |

OTHER PUBLICATIONS

International Application No. PCT/US2020/019254, Notification of Transmittal of the International Search Report and the Written Opinion of the International Searching Authority, mailed May 11, 2020, 17 pages.

(Continued)

*Primary Examiner* — Peggy A Neils
(74) *Attorney, Agent, or Firm* — Fish & Richardson P.C.

(57) ABSTRACT

A luminaire includes alight source (110), an optical system (111), and a luminous areal element (LAE) (150a, 150b). The optical system (111) is configured to receive light from the light source (110) and output the light into a first far-field light distribution (145). The optical system includes one or more optical elements arranged to direct light from an input aperture (118) of the optical system to an output aperture (132) of the optical system, and one or more output surfaces at the output aperture through which light is emitted. The surface has a first dimension T. The LAE (150a, 150b) is spaced from the output aperture (132), and is configured to output light according to a second far-field light distribution (155a, 155b). The LAE has a light emission surface through which light is emitted having a second dimension W greater than T. The first and the second light distributions at least in part overlap.

19 Claims, 14 Drawing Sheets

(56) References Cited

U.S. PATENT DOCUMENTS

| | | | |
|---|---|---|---|
| 9,423,101 B2* | 8/2016 | Holten | F21V 5/00 |
| 10,088,113 B1 | 10/2018 | Chen et al. | |
| 10,663,651 B2* | 5/2020 | Angelini | G02B 6/0096 |
| 11,278,195 B2* | 3/2022 | Oka | A61B 1/07 |
| 2012/0147621 A1 | 6/2012 | Holten et al. | |
| 2012/0287633 A1 | 11/2012 | Kelly et al. | |
| 2012/0294035 A1 | 11/2012 | Chang et al. | |
| 2013/0208495 A1* | 8/2013 | Dau | G02B 6/0078 |
| | | | 362/551 |

OTHER PUBLICATIONS

Office Action in European Appln. No. 20711746.6, dated Jan. 30, 2024, 6 pages.

* cited by examiner

LUMINAIRE WITH LUMINOUS ELEMENT

CROSS-REFERENCE TO RELATED APPLICATIONS

This application claims priority to U.S. Provisional Application No. 62/809,535, filed Feb. 22, 2019, the entire contents of which (including Annexes) are incorporated herein by reference.

FIELD OF THE TECHNOLOGY

The present technology relates to luminaires with a luminous element to limit visual discomfort and glare, in particular to solid-state luminaires.

BACKGROUND

Luminaires have been the prime source for artificial space illumination for a century. Historically, incandescent and gas discharge light sources have been widely used for general illumination purposes since the turn down of candles and gas lamps. Both incandescent and gas discharge light sources can generate large amounts of light within a small volume but are generally relatively bulky due to heat management or various other requirements. Today, incandescent and gas discharge light sources almost have been displaced by solid-state light (SSL) sources mostly light-emitting diodes (LEDs). Ongoing SSL developments have provided miniaturization and increasing amounts of light output. High luminance levels within a field of view relative to background, however, can affect human vision ranging from visual discomfort to disabling glare levels in regular space illumination or automotive lighting, for example. Furthermore, smaller luminaires can aggravate luminance issues already caused by high luminance light sources.

SUMMARY

The present technology relates to luminaires with a luminous element.

According to an aspect of the present technology, a luminaire includes a light source, an optical system, and a luminous areal element (LAE). The optical system is configured to receive light from the light source during operation of the luminaire and output the light into a first far-field light distribution. The optical system includes one or more optical elements arranged to direct light from an input aperture of the optical system to an output aperture of the optical system. The optical system also includes one or more output surfaces at the output aperture through which light is emitted, the surface having a first dimension, T, in a first direction. The LAE is spaced from the output aperture of the optical system, and is configured to output light during operation of the luminaire according to a second far-field light distribution. The LAE has a light emission surface with an extended surface area through which light is emitted having a second dimension, W, in the first dimension, where W>T and the first and the second far field light distributions at least in part overlap.

Implementations of this aspect may include one or more of the following features.

In some implementations, the output aperture can extend along a first curvilinear path, and the LAE can extend along a second curvilinear path that at least partially encloses the first curvilinear path In some implementations, the first curvilinear path can be equally spaced from the second curvilinear path along their respective lengths.

In some implementations, the output aperture can define a first annular shape, and the LAE can define a second annular shape.

In some implementations, the output aperture can extend along a first polygonal path, and the LAE can extend along a second polygonal path that at least partially encloses the first polygonal path.

In some implementations, the first polygonal path can be equally spaced from the second polygonal path along their respective lengths.

In some implementations, the one or more output surfaces at the output aperture and the light emission surface of the LAE can be coplanar.

In some implementations, the one or more output surfaces at the output aperture and the light emission surface of the LAE may not be coplanar.

In some implementations, the one or more output surfaces at the output aperture can be disposed on a first plane orthogonal to an axis extending between the input aperture and the output aperture, and the light emission surface of the LAE can be disposed on a second plane parallel to the first plane.

In some implementations, the one or more output surfaces at the output aperture can be disposed on a first plane orthogonal to an axis extending between the input aperture and the output aperture, and the light emission surface of the LAE can be angled relative to the first plane.

In some implementations, the light emission surface of the LAE can be disposed in a second plane orthogonal to the first plane.

In some implementations, the first direction can be orthogonal to an axis extending between the input aperture and the exit aperture.

In some implementations, W can be at least 2T.

In some implementations, the LAE can be configured, during operation, to receive at least some of the light outputted from the output aperture, and output at least some of the light received from the output aperture according to the second far-field light distribution.

In some implementations, the LAE can include an additional light source. The additional light source can be configured, during operation, to provide at least some of the light output by the LAE according to the second light distribution.

In some implementations, the LAE can include one or more light diffusing surfaces.

In some implementations, the LAE can include a substrate, and one or more additional light sources positioned on the substrate.

In some implementations, the one or more additional light sources can include one or more light emitting diodes.

In some implementations, the luminaire can include an additional LAE spaced from the output aperture. The output aperture can at least in part enclose the second LAE.

In some implementations, the output aperture can extend along a first curvilinear path, the LAE can extend along a second curvilinear path, and the additional LAE can extend along a third curvilinear path. The second and the third curvilinear paths can be equally spaced from the first curvilinear path along their respective lengths.

In some implementations, the output aperture can define a first annular shape, the LAE can define a second annular shape, and the additional LAE can define a third annular shape.

In some implementations, the one or more optical elements can include a light guide.

In some implementations, a first edge of the light guide can define the input aperture and a second edge of the light guide opposite the first edge can define the output aperture.

In some implementations, the light guide can be a cylindrical or a tubular light guide.

In some implementations, the light guide can be a slab light guide.

According to another aspect of the present technology, a luminaire includes a plurality of light emitting diodes (LEDs), a light guide, and an optical element. The light guide includes a first edge and a second edge opposite the first edge. The light guide is arranged to receive light from the plurality of LEDs at the first edge during operation of the luminaire and guide the light to the second edge, and output the light at the second edge according to a first far-field light distribution. The optical element is spaced from the light guide, and is arranged to output light at a luminous surface according to a second far-field light distribution. The luminous surface has an area larger than an area of the second edge of the light guide and the first and the second far-field light distributions at least in part overlap.

Implementations of this aspect may include one or more of the following features.

In some implementations, the luminous surface can face the same direction as the second edge of the light guide.

In some implementations, the second edge can extend along a first curvilinear path, and the luminous surface can extend along a second curvilinear path that at least partially encloses the first curvilinear path.

In some implementations, the first curvilinear path is equally spaced from the second curvilinear path along their respective lengths.

In some implementations, the second edge can define a first annular shape, and the luminous surface can define a second annular shape.

In some implementations, the second edge can extend along a first polygonal path, and the luminous surface can extend along a second polygonal path that at least partially encloses the first polygonal path.

In some implementations, the first polygonal path can be parallel to the second polygonal path.

In some implementations, the second edge and the luminous surface can be coplanar.

In some implementations, the second edge and the luminous surface may not be coplanar.

In some implementations, the second edge can be disposed on a first plane orthogonal to an axis extending between the first edge and the second edge, and the luminous surface can be disposed on a second plane parallel to the first plane.

In some implementations, the second edge can be disposed on a first plane orthogonal to an axis extending between the first edge and the second edge, and the luminous surface can be angled relative to the first plane.

In some implementations, the luminous surface can be in a second plane orthogonal to the first plane.

In some implementations, the optical element can be configured, during operation, to receive at least some of the light outputted from the second edge, and output at least some of the light received from the second edge according to the second far-field light distribution.

In some implementations, the optical element can include one or more additional LEDs. The one or more additional LEDs can be configured, during operation, to provide at least some of the light output by the luminous surface according to the second light distribution.

In some implementations, the optical element can include one or more light diffusing surfaces.

In some implementations, the luminous surface can be a light diffusing surface.

In some implementations, the optical element can include a substrate, and one or more additional LEDs positioned on the substrate.

In some implementations, the luminaire can include an additional optical element spaced from the light guide and having an additional luminous surface. The second edge can at least in part enclose the additional optical element.

In some implementations, the second edge can extend along a first curvilinear path, the luminous surface can extend along a second curvilinear path, and the additional luminous element can extend along a third curvilinear path. The second and the third curvilinear paths can be equally spaced from the first curvilinear path along their respective lengths.

In some implementations, the second edge can define a first annular shape, the luminous surface can define a second annular shape, and the additional luminous surface can define a third annular shape.

In some implementations, the light guide can be a cylindrical or tubular light guide.

In some implementations, the light guide can be a slab light guide.

According to another aspect of the present technology, a luminaire includes a primary light source; an optical system with an elongate output aperture; and a luminous areal element (LAE). The primary light source is optically coupled with the optical system, and the optical system is configured to receive light from the primary light source and output light from the output aperture having a first light distribution. Additionally, the LAE extends along the output aperture and is configured to provide light having a second light distribution. The first and second light distributions at least in part overlap. Here, the second light distribution is configured to reduce contrast in luminance of the first light distribution and an ambient background surrounding the luminaire.

Implementations of this aspect may include one or more of the following features.

In some implementations, the output aperture can have a width perpendicular to its elongate extension that is smaller than a width of the LAE. For instance, the width of the LAE is at least twice the width of the output aperture.

In some implementations, the output aperture can extend along a straight path. In some implementations, the output aperture can extend along a curvilinear path. In some implementations, the output aperture can undulate along its extension. In some implementations, the output aperture can have an annular shape. In some implementations, the output aperture can extend along a polygonal path.

In some implementations, an edge of the LAE and an edge of the output aperture can be coplanar. For instance, the LAE and the output aperture can be coplanar.

In some implementations, the LAE can surround the output aperture. In some implementations, the output aperture can surround the LAE.

In some implementations, the LAE can have an annular shape. In some implementations, the LAE can have a disk shape. For instance, the disk is circular.

In some implementations, the LAE can include a secondary light source separate from the primary light source. In some cases, the secondary light source includes an organic light-emitting diode. In some cases, the primary and secondary light sources are independently controllable.

In some implementations, the LAE can be arranged along a surface of the luminaire other than the output aperture of the optical system. For instance, the LAE is transparent.

In some implementations, the LAE can be optically coupled with the optical system and receives light from the primary light source. For instance, the LAE receives some light output from the output aperture.

In some implementations, the LAE can extend into the output aperture to receive some light output from the output aperture and redistributes the received light into the second light distribution.

In some implementations, the luminaire can include a trim arranged to surround the output aperture in an installed configuration of the luminaire. Here, the trim includes the LAE.

According to another aspect of the present technology, a luminaire includes a primary light source; an optical system with an output aperture, the optical system coupled with the primary light source to receive light from the primary light source and output light from the output aperture having a first light distribution; and a luminous areal element (LAE) including a secondary light source separate from the primary light source. The LAE is configured to provide light having a second light distribution. Additionally, the first and second light distributions at least in part overlap.

Among other advantages, the disclosed luminaires may be configured to provide intensity profiles of light that limit glare and improve visual comfort (e.g., by providing at least some light using an LAE having a luminous or light emitting surface with an extended surface area). Such luminaires can be configured to limit luminance gradients relative to a surrounding background. In some implementations, the light distribution provided by the luminaire can effectively light a space, for example, by providing a uniform illuminance on target surfaces. As such, the present technology provides a luminous element with the luminaire that is configured to provide light that controls luminance and luminance gradients within the field of view of observers. The luminous element may have an areal extension and provide light in a diffuse, diffuse specular, directed or other manner.

In some implementations, luminaires can be configured to mix light emitted from multiple point-like sources, such that direct and/or indirect illumination output thereby have specifiable luminance and/or color uniformities.

These and/or other advantages may be provided by luminaires that are relatively inexpensive to manufacture. For example, the luminaires may be composed of relatively few components. Moreover, the individual components may be formed from conventional optical materials (e.g., optical plastics such as acrylic polymers or polycarbonate) and/or by conventional techniques.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF THE FIGURES

Like elements in different figures are identified with the same reference numeral.

DETAILED DESCRIPTION

The present technology provides a luminaire that includes a subsystem for providing light according to a first far-field light intensity distribution (e.g., to illuminate a space), and a subsystem of one or more luminous areal elements (LAEs) for providing light according to a second far-field light intensity distribution. In combination, the two subsystems provide good visual comfort to an observer when directly viewing the luminaire during operation (e.g., by reducing glare experienced by the observer). The present technology is applicable for luminaires having low to very high light outputs.

Figure 1A:
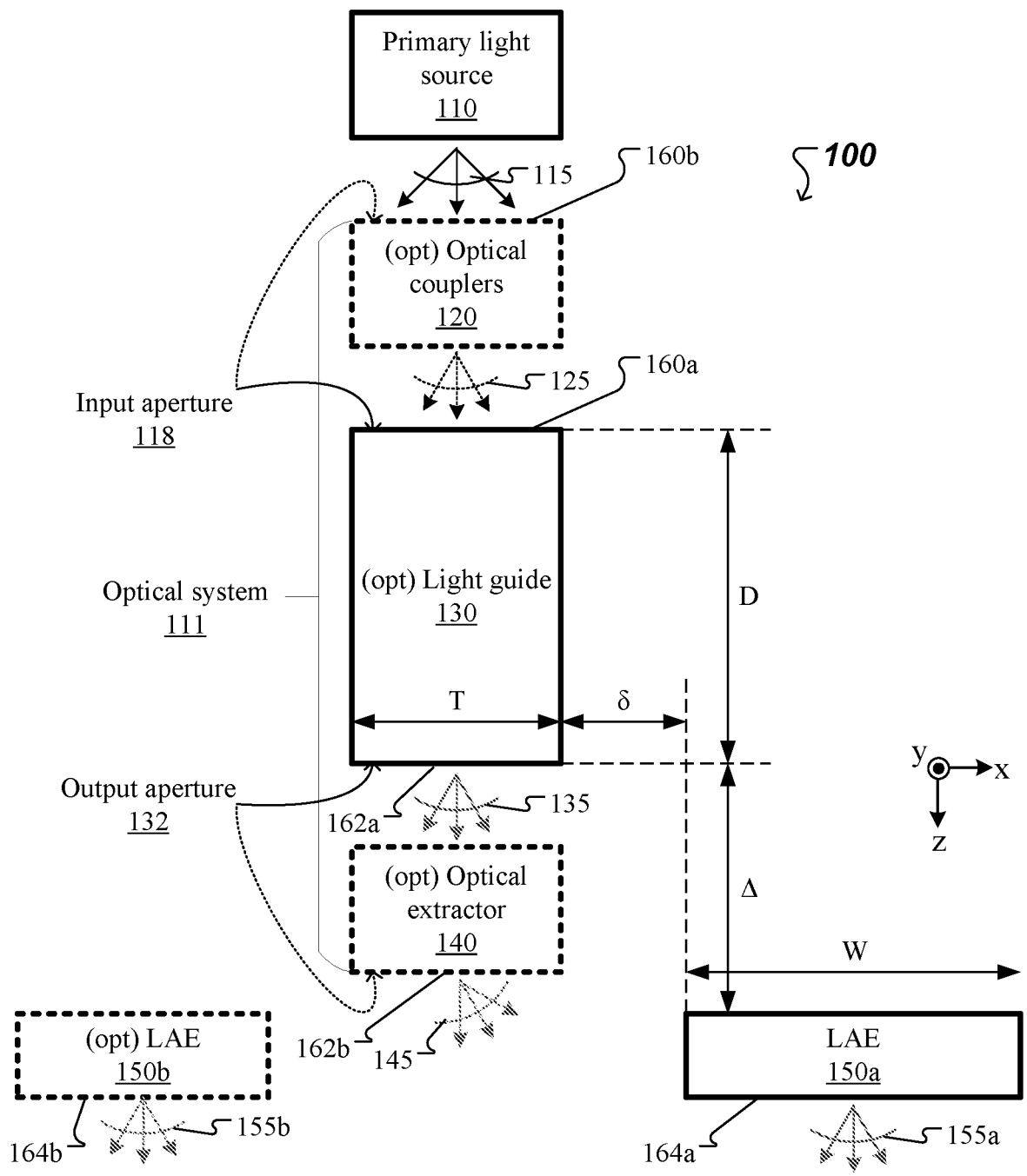
FIG. 1A illustrates a block diagram of a luminaire having one or more luminous areal elements (LAEs).

FIG. 1A illustrates a block diagram of an example luminaire 100 which includes a luminous areal element (LAE) 150a. The LAE can be actively lit including its own separate light source, or it can be passive lit drawing light from the same light source as the luminaire's optical system, for example.

The example luminaire 100 includes primary light source 110 and an optical system 111. The primary light source 110 is configured to produce light to be used at least by the optical system 111. In the example shown in FIG. 1A, the light produced by the primary light source 110 is provided to the optical system 111 in an angular range 115 along a forward direction, e.g., along the z-axis.

In general, the optical system is configured to steer the light produced by the primary light source to a surface to be illuminated by the luminaire. As such, the optical system includes an input aperture 118 configured to receive light from the primary light source 110, and an output aperture 132 configured to output light from the optical system 111 to the target illumination surface. Depending on the implementation, the output aperture can be provided by one or more elements of the luminaire and can include one or more output surfaces. An output surface may be planar, non-planar, annular, cylindrical, conical, spherical, irregular or have other shapes. If present, different output surfaces in a luminaire may be co-planar, parallel, conforming or have independent shapes. An output surface may be provided by a solid transparent element, a hollow element with a reflective shell or one or more combinations of both. Output surfaces that are provided by hollow elements can be considered notional.

In the example illustrated in FIG. 1A, the optical system 111 includes a light guide 130. Here, the light guide 130 guides light over a distance D in the forward direction, along the z-axis. In some implementations, an input end of the light guide 130 (e.g., one or more input surfaces or edges 160a) forms the input aperture 118 of the optical system 111, and an output end of the light guide 130 (e.g., one or more output surfaces or edges 162a) can form the output aperture 132 of the optical system 111. The light guide 130 has a thickness T along a first direction orthogonal to the forward direction, e.g., along the x-axis, and a length L (not shown in FIG. 1A) along a second direction orthogonal to both the forward direction and the first direction, e.g., along the y-axis, where T<<L. Thus, the output aperture 132 is elongated along the y-axis.

The light guide can be configured to guide light via total internal reflection or other forms of reflection or both. As such the light guide can be formed as a single solid transparent element, inwardly reflective outer elements, or combinations of one or more of such types of elements. The light guide may include one or more materials and can have homogenous or varying refractive index.

In some implementations, the optical system 111 includes optical couplers 120 optically coupled with the input end of the light guide 130. In this case, input ends of the optical couplers 120 (e.g., one or more input surfaces or edges 160b) form the input aperture 118 of the optical system 111. The optical couplers 120 are configured to receive the light from the primary light source 110 in the first angular range 115, collimate it, and provide the collimated light to the light guide 130 in a second angular range 125 along the forward direction, such that a divergence of the second angular range 125 is smaller than a divergence of the first angular range 115.

In some implementations, the light output by the luminaire 100 towards the target illumination surface through the output aperture 132 of the light guide 130 is in a first output angular range 135 along the forward direction, e.g., along the z-axis.

In some implementations, the optical system 111 includes an optical extractor 140 coupled to the output end of the light guide 130. In this case, one or more output surfaces or edges 162b of the optical extractor 140 form the output aperture 132 of the optical system 111. The optical extractor 140 is configured to receive the guided light from the light guide 130 in the first output angular range 135, redirect and/or reshape it, and provide the redirected/reshaped light to the target illumination surface through the output aperture 132 of the optical extractor 140 in a second output angular range 145 along an output direction that can deviate from the forward direction, e.g., it can form a non-zero angle with the z-axis.

The LAE 150a extends along the output aperture 132 and is spaced apart therefrom by a first offset $\Delta$ in the forward direction, e.g., along the z-axis, and as second offset $\delta$ along the first direction orthogonal to the forward direction, e.g., along the x-axis. Moreover, the LAE 150a has a size W along the first direction. In some implementations, the size W of the LAE 150a is larger than a size T of the output aperture 132 along the first axis, T<W. For instance, W=1.1, 1.2, 1.3, 1.5, 2, 3, 5 or 10×T. Note that since the LAE 150a extends along the output aperture 132, its length along the second direction, here the y-axis, can be the same as the length L of the output aperture 132 along this direction.

Based on the convention of FIG. 1A, the LAE 150a is disposed below, coplanar with, or above, the output aperture 132 when the first offset satisfies the following conditions $\Delta>0$, $\Delta=0$, $\Delta<0$, respectively. Also, when $\Delta>0$, the LAE 150a can at least partially overlap the output aperture 132 if the second offset is negative, $\delta<0$, or has no overlap with the output aperture 132 if the second offset satisfies the following condition $\delta\geq 0$. A magnitude of the second offset $|\delta|$ is typically a fraction of the size T of the output aperture 132 along the first axis. For instance, $|\delta|=0.1, 0.2, 0.3,$ or $0.5\times T$.

Moreover, the LAE 150a is configured to provide light (e.g., from one or more luminous or light emitting surfaces 164a) towards the target illumination surface in a first areal angular range 155a, e.g., oriented along the forward direction. Notably, the LAE 150a is arranged and configured such that a far-field light intensity distribution of the light provided by the optical system 111 in the first output angular range 135 (or in the second output angular range 145) at least partially overlaps a far-field light intensity distribution of the light provided by the LAE 150b in the first areal angular range 155a.

In some implementations, the one or more luminous or light emitting surfaces 164a of the LAE 150a can have an extended surface area relative to the thickness of the LAE 150a. As an example, referring to FIG. 1A, the surface area of the 164a with respect to the x-y plane can be greater than the thickness of the LAE 150a with respect to the z-axis.

Figure 1B:
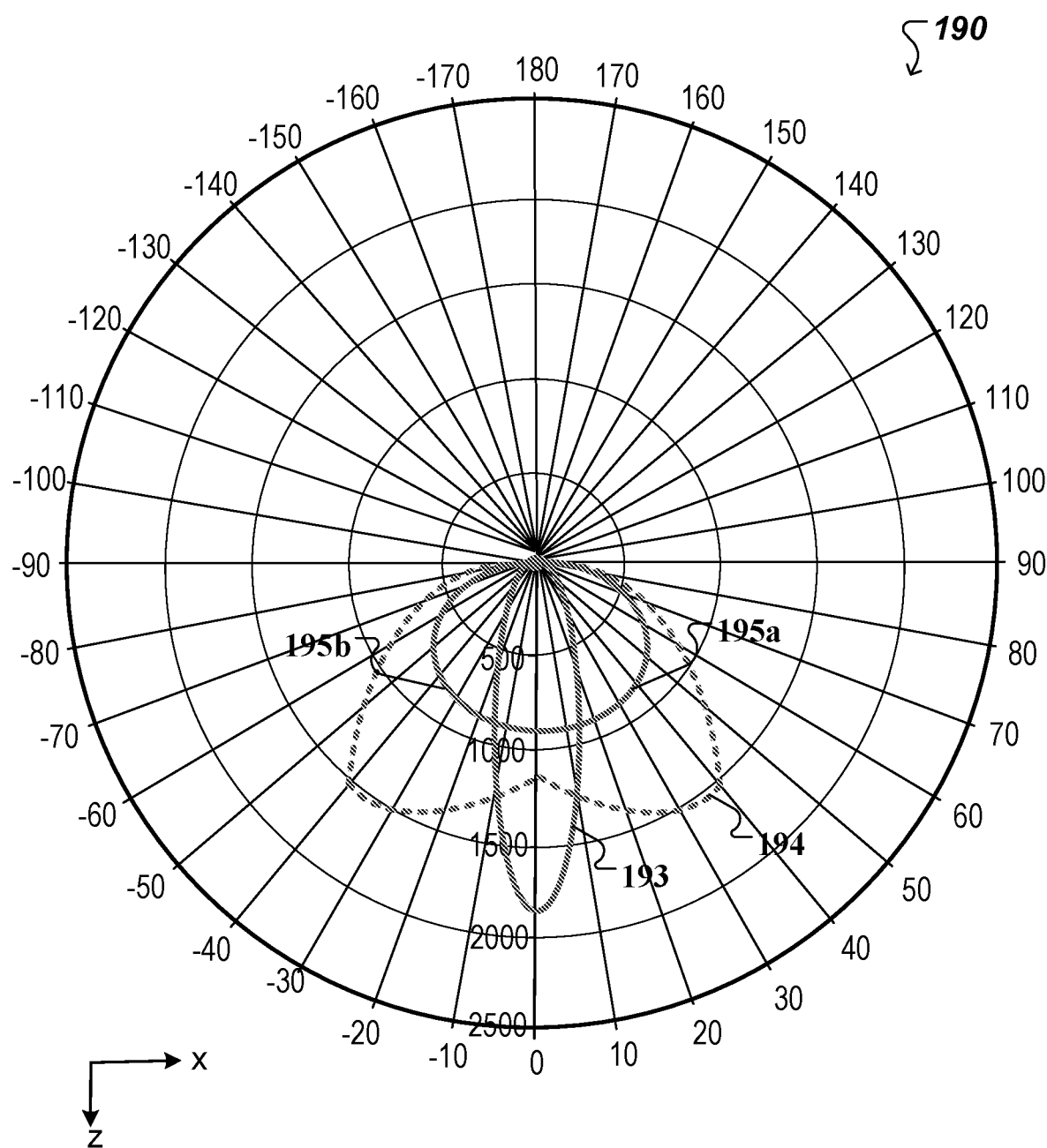
FIG. 1B shows an intensity distribution of light output by the luminaire of FIG. 1A.

FIG. 1B shows a far-field intensity distribution 190 of light output by an example of the luminaire 100. Here, lobe 193 represents the distribution of the light provided by the optical system 111 in the first output angular range 135. By comparison, if an optical extractor 140 is included, the lobe 193 may be replaced, for example, by lobe 194 representing the intensity of the light provided by the optical system 111 in the second output angular range 145. Lobe 195a represents the distribution of the light provided by the LAE 150a in the first areal angular range 155a. The overlap between lobe 195a and lobe 193 (or 194) causes reduction of contrast in luminance of the light distribution corresponding to the first (or second) output angular range and an ambient background surrounding the luminaire. Luminance ratios of light from the output aperture 132 and that of the LAE are shown qualitatively only.

Referring again to FIG. 1A, the luminaire 100 can include another LAE 150b extending along the output aperture 132 and arranged on the other side, e.g., along the x-axis, of the output aperture 132. This second LAE 150b can be disposed to have the same offsets from the output aperture 132 as the first LAE 150a, or can have different offsets. The second LAE 150b can have a size of along the first direction and a size of the second direction that are the same as the respective first and second sizes of the first LAE 150a. Moreover, the second LAE 150b also may be configured to provide light (e.g., from one or more luminous or light emitting surfaces 164b) towards the target illumination surface, this time in a second areal angular range 155b, e.g., oriented along the forward direction. Notably, the second LAE 150b is arranged and configured such that a far-field light intensity distribution of the light provided by the optical system 111 in the first output angular range 135 (or in the second output angular range 145) at least partially overlaps a far-field light intensity distribution of the light provided by the second LAE 150b in the second areal angular range 155b.

In some implementations, the one or more luminous or light emitting surfaces 164b of the LAE 150b also can have an extended surface area relative to the thickness of the LAE 150b. As an example, referring to FIG. 1A, the surface area of the 164b with respect to the x-y plane can be greater than the thickness of the LAE 150b with respect to the z-axis.

In FIG. 1B, lobe 195b represents the intensity of the light provided by the second LAE 150b in the second areal angular range 155b. Note that in this example, the lobes 195a and 195b completely overlap, so that the lobe 195b enforces the effect of the lobe 195a to reduce the contrast in luminance of the light distribution corresponding to the first (or second) output angular range and an ambient background surrounding the luminaire.

Luminaires according to the present technology can illuminate a space by providing intensity profiles of light that limit glare and improve visual comfort for observers (e.g., compared to luminaires without LAEs). For instance, such luminaires can be configured to limit luminance gradients relative to a surrounding background. The light distribution provided by such luminaires can effectively light a space, for example, by providing a uniform illuminance on target surfaces. Accordingly, such luminaires can provide light that controls luminance and luminance gradients within the field of view of observers.

In practice, the dimensions of the luminaire 100 can vary, depending on the implementation. Furthermore, different implementations of the luminaire 100 may have different nominal amounts of light output. In some implementations, one or more dimensions of respective LAEs may be affected by one or more dimensions of the output aperture, the (nominal) amount of light output from the luminaire or both. In some cases, sizing of an LAE may be affected by aspects regarding visual comfort or glare alone or in combination with one or more of the noted or other aspects of the luminaire. As an example, the size W of the LAE 150a and/or LAE 150b can be 5 mm, 1cm, 2 cm or 5 cm or other size. As another example, the size T of the output aperture 132 can be 1 mm, 3 mm, 5 mm or 1 cm or other size. As another example, the distance D can be 5 mm, 1 cm, 3 cm, 5 cm or 10 cm or other distance in implementations with a light guide. As another example, the offset $\Delta$ can be 0 mm, 3 mm, 5 mm, 1 cm or 5 cm or other offset. As another example, the offset $\delta$ can be 0 mm, 3 mm, 5 mm or 1 cm or other offset.

Figure 9:
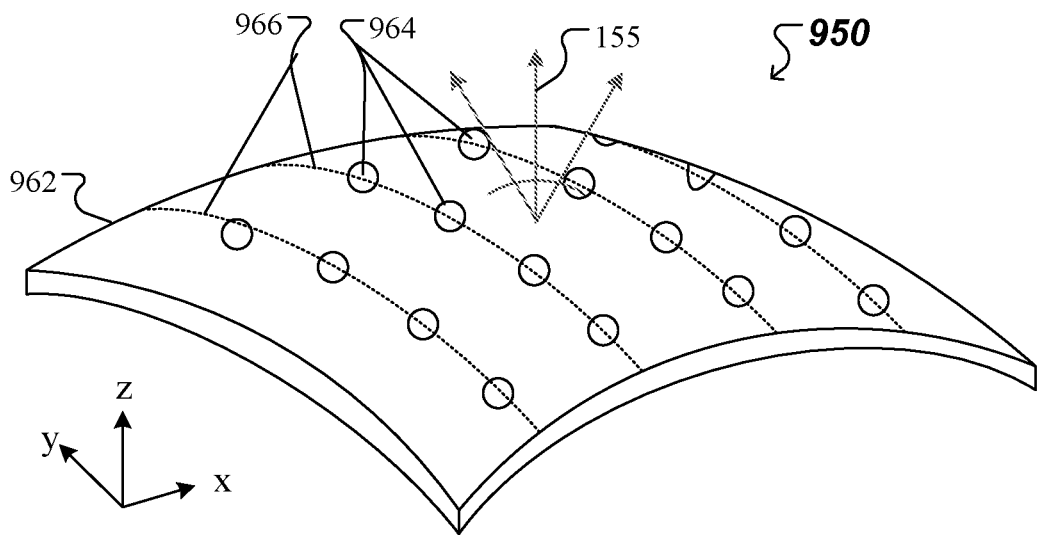
FIG. 9 shows an example of a LAE implemented as a light sheet.

In some implementations, one or both of the LAEs 150a, 150b can be implemented as a light sheet 950 as the one illustrated schematically in FIG. 9. The light sheet 950 includes a substrate 962 and a plurality of LED dies 964 supported by the substrate 962. The LEDs can be fabricated from inorganic electroluminescent materials, or from organic electroluminescent materials. The light sheet 950 also includes conductors 966 arranged along the substrate 962 which are used to power the LED dies 964. Here, the plurality of LED dies 964 is a secondary light source of the light sheet 950. For instance, the LED dies 964 are arranged and configured to emit light away from the substrate 962. In this manner, the light sheet 950 can provide light in an areal angular range 155 along a direction substantially normal to a plane of the substrate 962.

Figure 10:
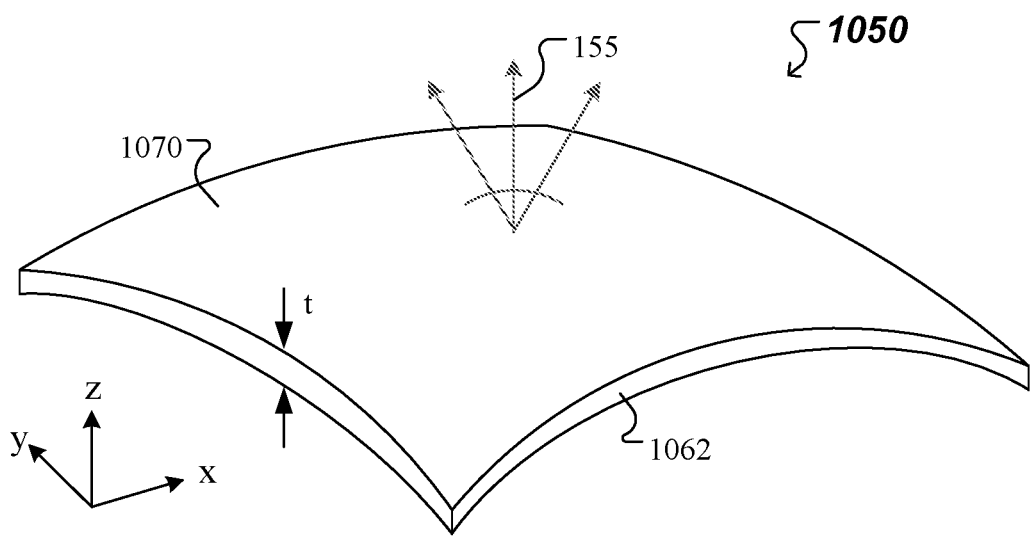
FIG. 10 shows an example of a LAE implemented as a film including electro-luminescent polymer.

In some implementations, one or both of the LAEs 150a, 150b can be implemented as an LAE 1050 illustrated schematically in FIG. 10. The LAE 1050 includes a substrate 1062 and a thin film 1070 coated on the substrate 1062. Here, the thin film 1070 is formed from electroluminescent polymers applied to, or grown onto, the substrate 1062. The electroluminescent polymers of the thin film 1070 can be powered by applying a voltage to a cathode and anode disposed in contact with the thin film (not show in FIG. 10.) As such, the electroluminescent polymers of the thin film 1070 represent a secondary light source of the LAE 1050. For instance, when powered, the electroluminescent polymers of the thin film 1070 of the LAE 1050 can provide light in an areal angular range 155 along a direction substantially normal to a plane of the substrate 1062.

Referring again to FIG. 1A, note that the primary light source 110 and secondary light sources associated with each of the LAEs 150a, 150b can be independently controllable.

In some implementations, the LAEs 150a, 150b need not have their own secondary light sources. Instead, at least one of such "passive" LAEs 150a, 150b can be optically coupled with the optical system 111 to receive light from the primary light source 110. For instance, the passive LAE 150a or 150b can receive some light output from the output aperture 132. Here, a passive LAE 150a/b can be implemented as a transparent and diffusive (i.e., light scattering or translucent) medium, a fluorescent sheet or otherwise implemented. Luminaires having a passive LAE are described in detail below in connection with FIGS. 7A-7B.

Figure 2A:
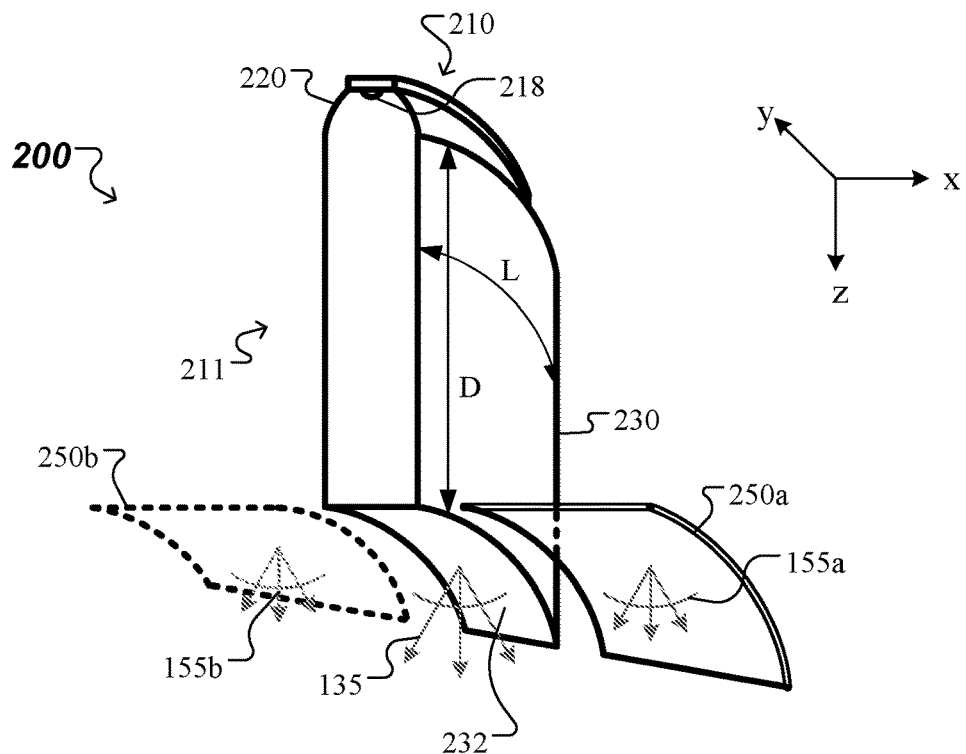
FIGS. 2A-2C illustrate aspects of a first example of a luminaire having one or more LAEs.
Figure 2B:
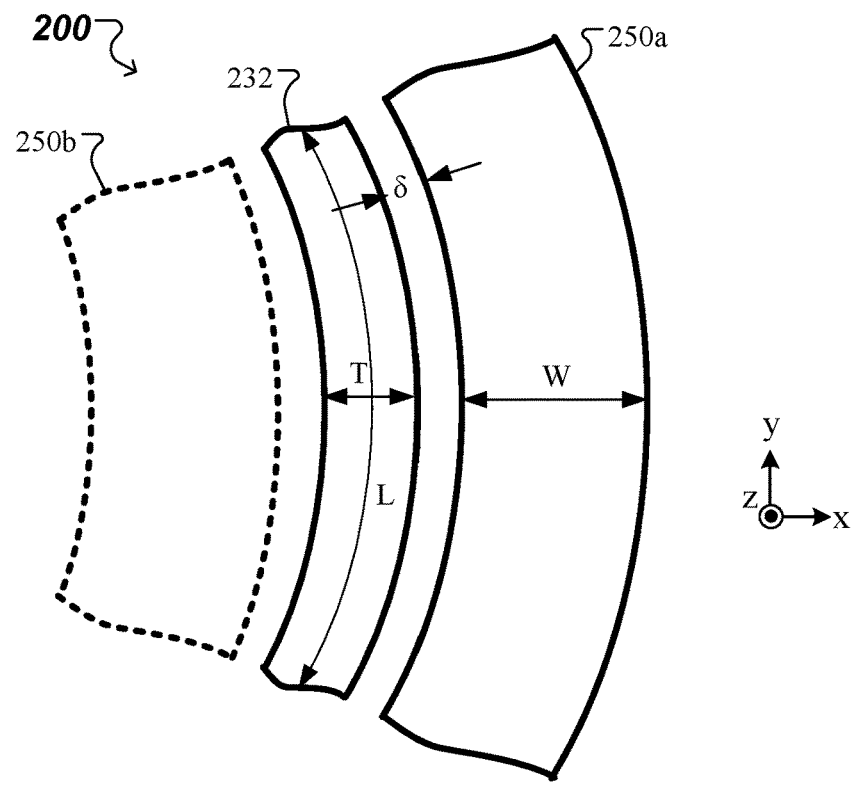
Figure 2C:
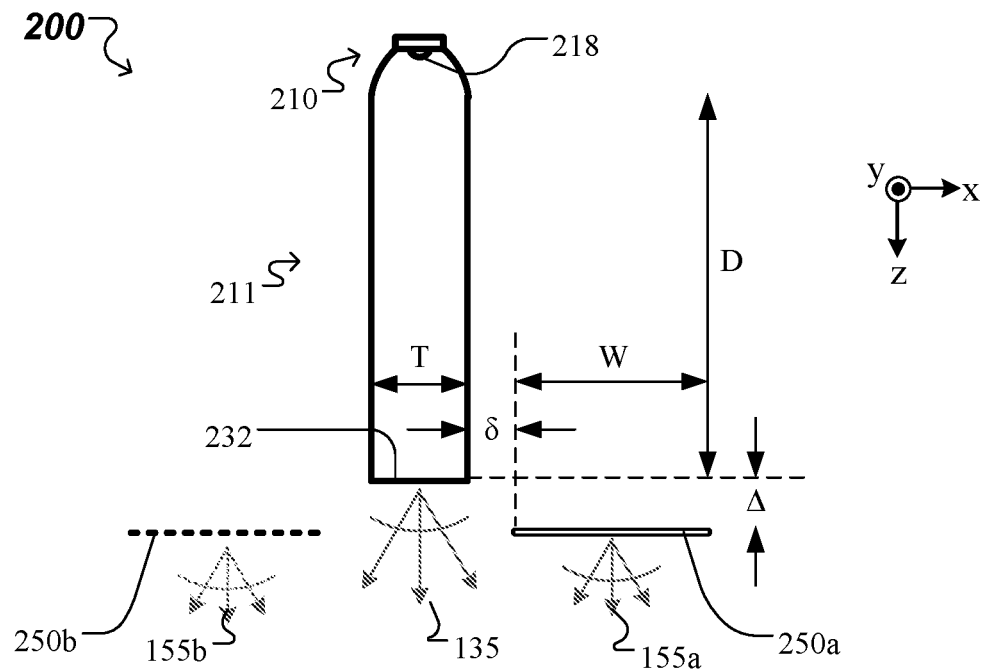

FIGS. 2A, 2B and 2C are a perspective view, a bottom view and a side view, respectively, of a luminaire 200 having at least one LAE 250a. The luminaire 200 is elongated along directions orthogonal to a forward direction. Here, the forward direction is along the z-axis, and the orthogonal directions can include the y-axis.

The luminaire 200 can be implemented in a manner similar to the luminaire 100 described above. For instance, the luminaire 200 includes a primary source 210 and an optical system 211 optically coupled with the primary source 210. Here, the optical system 211 has an input aperture 218 (e.g., formed from one or more input surfaces or edges) and an output aperture 232 (e.g., formed from one or more output surfaces or edges) and is arranged and configured to steer light received from the primary source 210 along the z-axis. The primary source 210 can be implemented in a manner similar to the primary source 110, and the optical system 211 can be implemented in a manner similar to the optical system 111.

In the example illustrated in FIGS. 2A and 2C, the optical system 211 includes an optical coupler 220 optically coupled with the primary source 210. Here, the input aperture of the optical coupler 220 is the input aperture 218 of the optical system 211. The optical system 211 also includes a light guide 230 having input and output ends separated along the z-axis by a distance D. The input end of the light guide 230 is optically coupled with the optical coupler 220. The output end of the light guide 230 is the output aperture 232 of the optical system 211. A thickness of the light guide 230, and therefore a width of the output aperture 232 in the (x,y)-plane, is T. Moreover, the output aperture 232 can be optically planar, Fresnel-lensed, have a macroscopic v-groove (either with a symmetrical or asymmetrical profile), include a diffraction grating or be otherwise configured. The combination of optical components 218, 220, 230, 232 of the optical system 211 is configured such that the optical system 211 outputs light in an output angular range 135 along the z-axis.

FIGS. 2A-2B show a portion of the output aperture 232 extending along a curvilinear path of length L. Note that other portions of the aperture 232, not shown in FIGS. 2A-2B, can continue along the illustrated curvilinear path, or can undulate along its extension, i.e., along the general direction of the y-axis.

The LAE 250a can be implemented in a manner similar to the LAE 150a of the luminaire 100 to output light in a first areal angular range 155a along the z-axis. In some implementations, when the luminaire 200 includes a second LAE 250b, it can be implemented in a manner similar to the second LAE 150b of the luminaire 100 to output light in a second areal angular range 155b along the z-axis. A far-field intensity distribution of the light output by luminaire 200 in the output angular range 135 and the first areal angular range 155*a* (and optionally the second areal angular range 155*b*) has corresponding overlapping lobes that are similar to the lobes 193, 195*a* (and 195*b*) shown in FIG. 1B.

Further, in the example luminaire 200, e.g., as shown in FIGS. 2A-2B, the LAE 250*a/b* (e.g., the one or more luminous or light emitting surfaces of the LAE 250*a/b*) also extend along curvilinear paths that can be parallel to the curvilinear path of the output aperture 232 (e.g., the one or more output surfaces of the output aperture 232). For example, the one or more luminous or light emitting surfaces of the LAE 250*a/b* can extend along curvilinear paths that are equally spaced from the curvilinear path of the one or more output surfaces of the output aperture 232 along their respective lengths. FIG. 2C shows that the LAE 250*a* is offset from the output aperture 232 along the z-axis by an axial offset Δ. FIGS. 2B-2C also show that the LAE 250*a* has a width W in the (x,y)-plane, and is offset laterally from the output aperture 232 by a lateral offset δ. As noted above, the width T of the output aperture 232 is configured to be smaller, or much smaller than the width W of the LAE 250*a*. When present, the second LAE 250*b* can have a width that is similar to, or different from, the width W of the first LAE 250*a*. and can be offset from the output aperture 232 by axial and lateral offsets that are similar to, or different from, the axial and lateral offsets Δ, δ associated with the first LAE 250*a*.

Figure 2D:
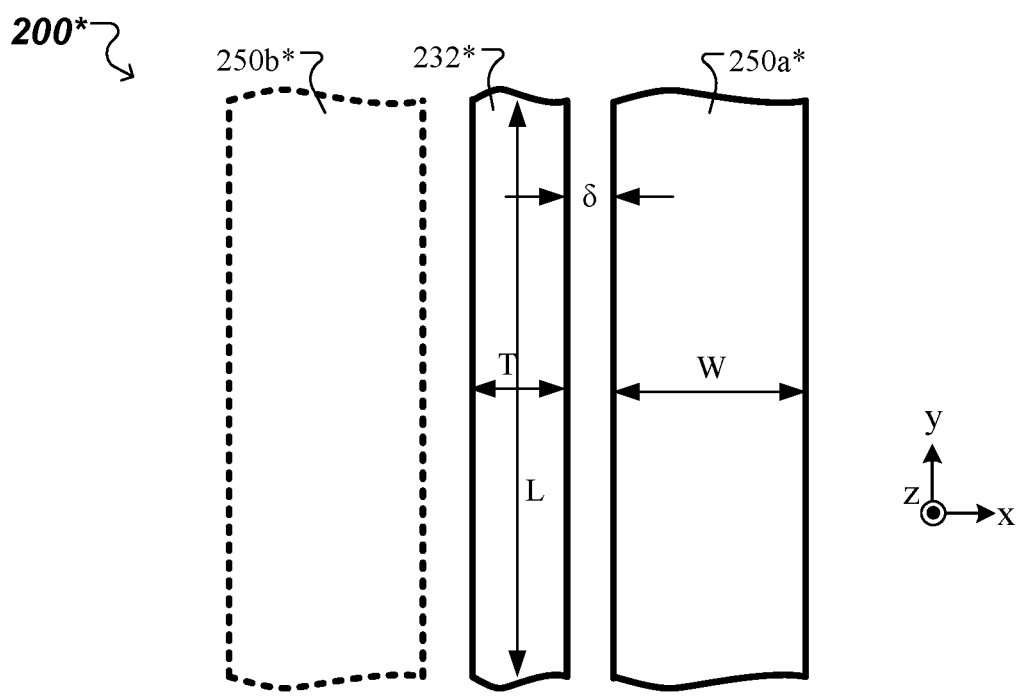
FIG. 2D illustrates a schematic sectional view of a second example of a luminaire having one or more LAEs.

The luminaire 200 can be modified to obtain a luminaire that is elongated over a straight path. FIG. 2D illustrates a bottom view of such a luminaire 200* having one or more LAEs 250*a**, 250*b** which are straight along the y-axis at least over a length L. Here, the output aperture 232* extends along a straight path as well as the LAE 250*a*/b*. All the other components of the luminaire 200* can be configured either similarly to, or different from, the corresponding components of the luminaire 200.

Figure 3A:
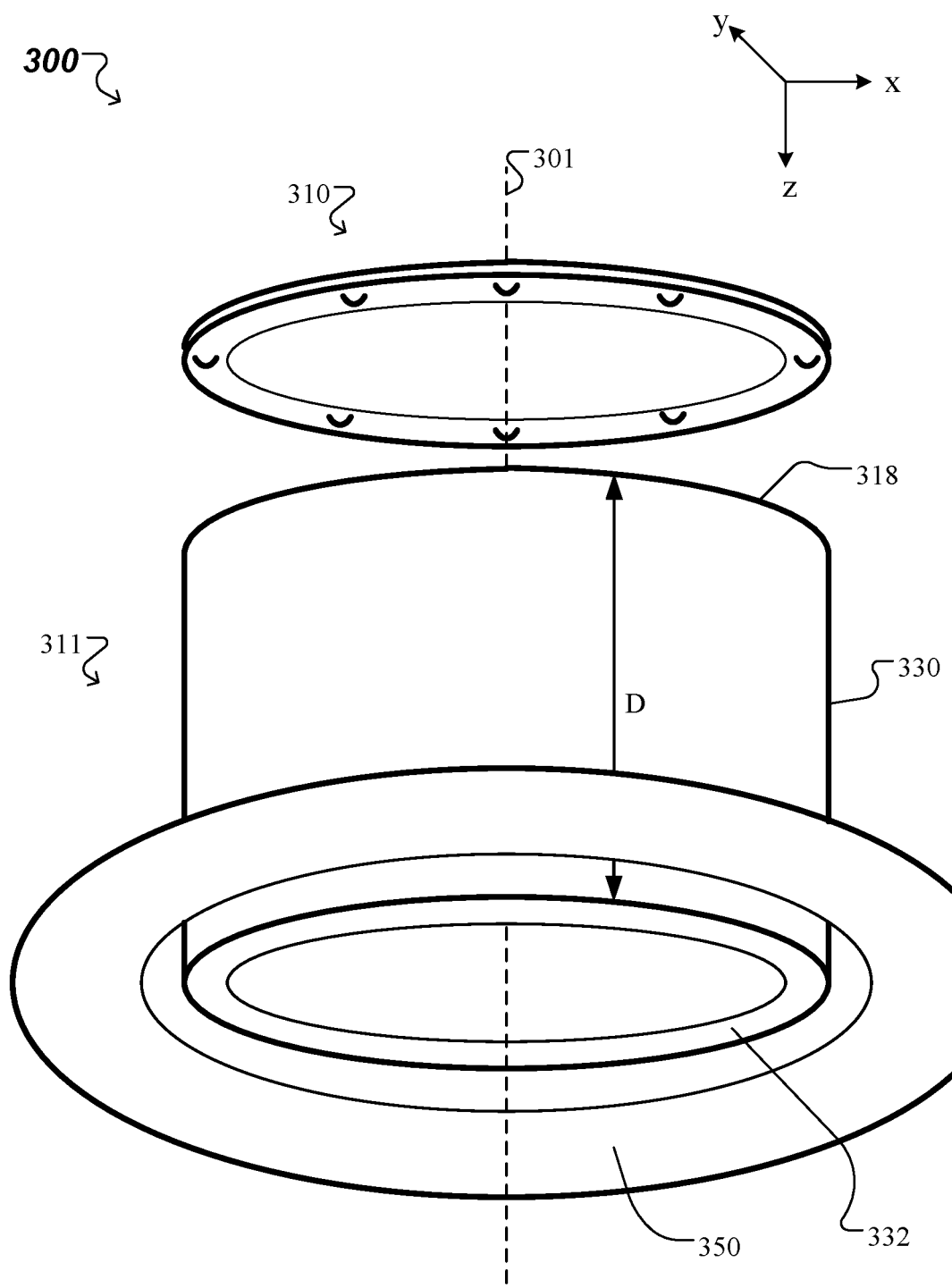
FIGS. 3A-3C illustrate aspects of a third example of a luminaire having a luminous areal element (LAE).
Figure 3B:
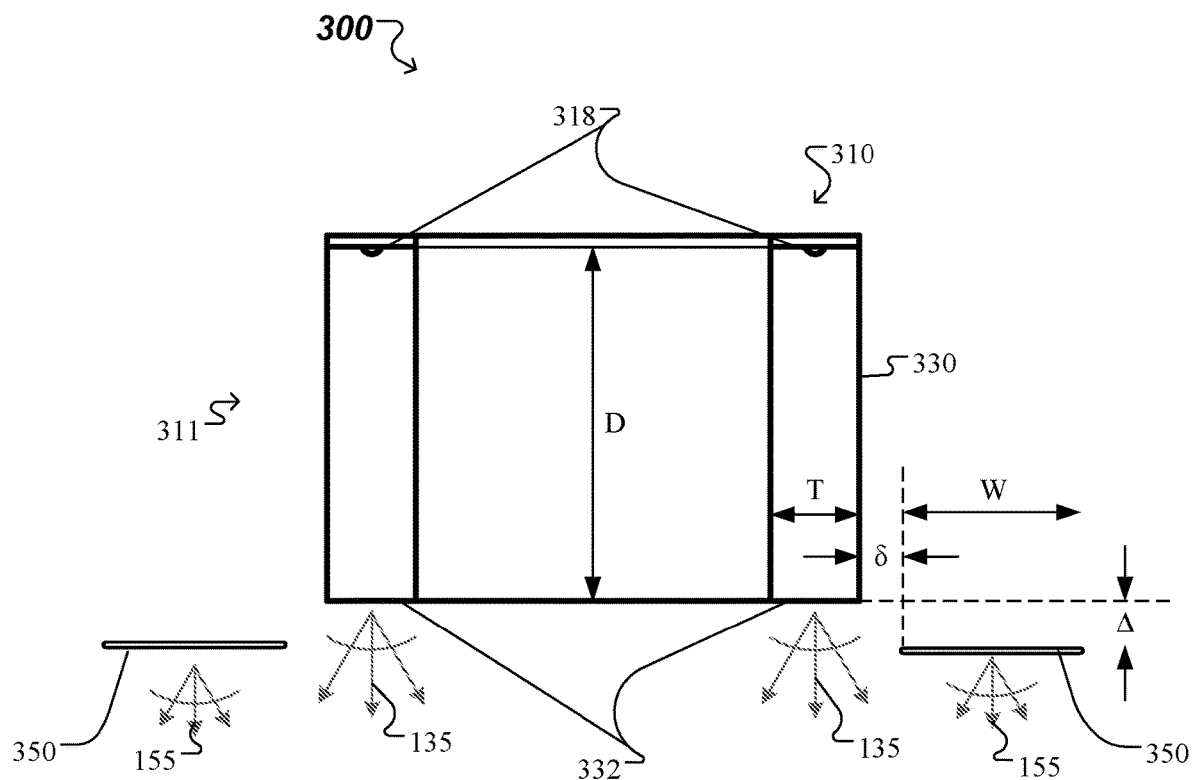
Figure 3C:
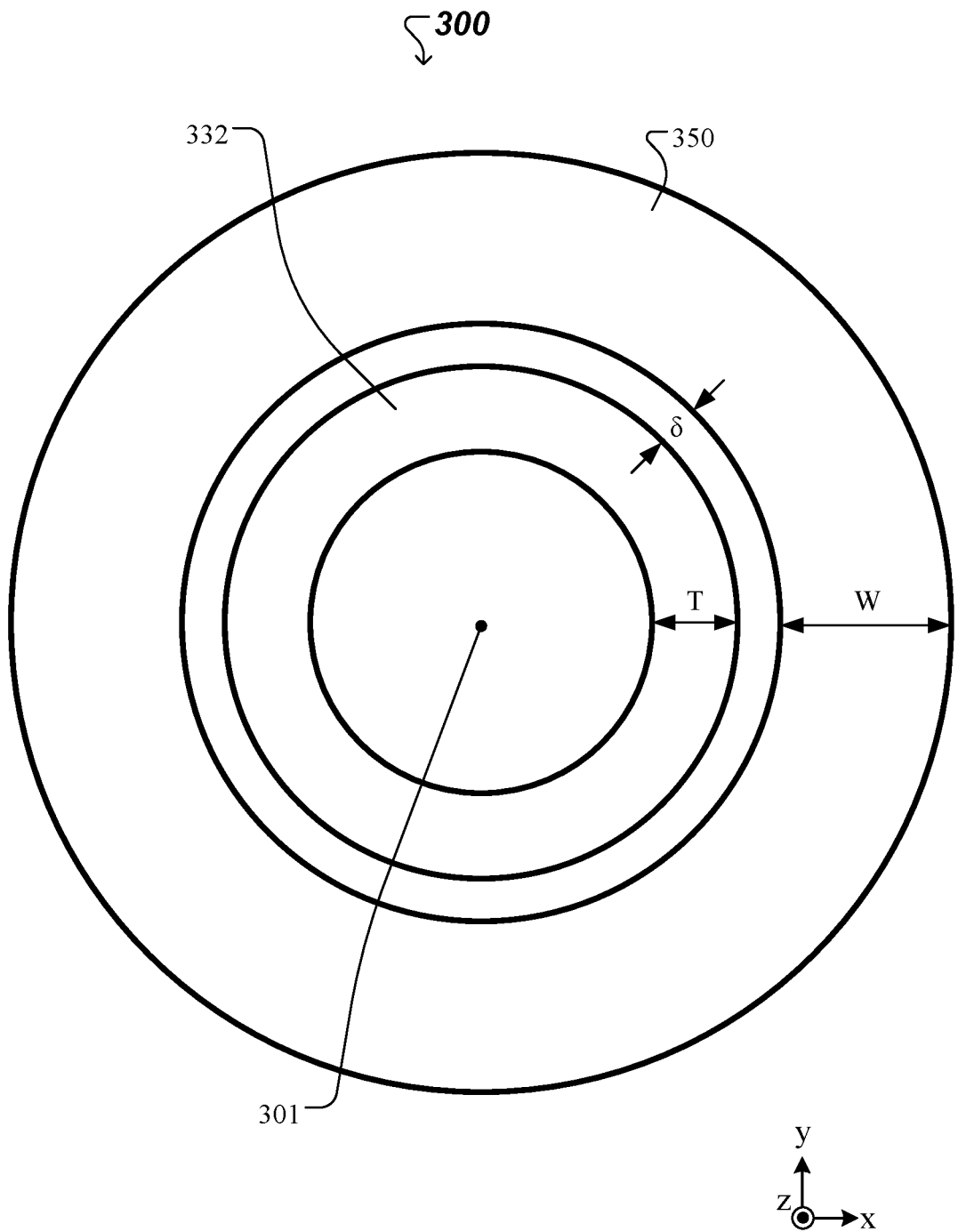

FIGS. 3A, 3B and 3C are a perspective, partially exploded view, a side view, and a bottom view, respectively, of a luminaire 300 having a LAE 350. The luminaire 300 has a tubular configuration, i.e., it is elongated along an azimuthal direction orthogonal to a forward direction. Here, the forward direction is along the z-axis, and the azimuthal direction is within the (x,y)-plane. As such, the luminaire 300 has an optical axis 301 parallel to the forward direction.

The luminaire 300 can be implemented in manner similar to the luminaire 100 described above. Here, the luminaire 300 includes an annular-shaped primary source 310 and a tubular optical system 311 optically coupled with the primary source 310. Here, the optical system 311 has an annular-shaped input aperture 318 (e.g., formed from one or more input surfaces or edges) and an annular-shaped output aperture 332 (e.g., formed from one or more output surfaces or edges) and is arranged and configured to steer light received form the annular-shaped primary source 310 along the z-axis. The annular-shaped primary source 310 can be implemented in a manner similar to the primary source 110, and the tubular optical system 311 can be implemented in a manner similar to the optical system 111.

In the example illustrated in FIGS. 3A-3B, the optical system 311 includes a tubular light guide 330 having input and output ends separated along the z-axis by a distance D. Here, the input end of the light guide 330 is the annular-shaped input aperture 318 of the optical system 311, and the output end of the light guide 330 is the annular-shaped output aperture 332 of the optical system 311. The input end of the tubular light guide 330 is optically coupled with the annular-shaped primary source 310. A thickness of the tubular light guide 330, and therefore a width of the annular-shaped output aperture 332 in the (x,y)-plane, is T. Moreover, the output aperture 332 can be fabricated to be optically planar, or Fresnel-lensed, to have a conical profile, or otherwise. The combination of optical components 318, 330, 332 of the tubular optical system 311 is configured such that the optical system 311 outputs light in an output angular range 135 along the z-axis.

The LAE 350 can be implemented, in a manner similar to the LAE 150*a* of the luminaire 100, e.g., as either the light sheet 950 or the LAE 1050, to output light in an areal angular range 155 along the z-axis. A far-field intensity distribution of the light output by (a cross-section along the (x,z)-plane of) the luminaire 300 in the output angular range 135 and the areal angular range 155 has corresponding overlapping lobes that are similar to the lobes 193 and 195*a* shown in FIG. 1B. Note that, in general, the complete far-field distribution of an axial-symmetric tubular optic cannot be asymmetrical even if a single section portion is asymmetric, because two diametrically opposite asymmetric but mirror-symmetric distributions combine/superimpose into a symmetric one.

Further in the example luminaire 300, e.g., as shown in FIGS. 3A and 3C, the LAE 350 (e.g., the one or more luminous or light emitting surfaces of the LAE 350) also extends over a closed curvilinear path that is parallel to the closed curvilinear path of the annular-shaped output aperture 332 (e.g., the one or more output surfaces of the output aperture 332). For example, the one or more luminous or light emitting surfaces of the LAE 350 can extend over a closed curvilinear path that is equally spaced from the closed curvilinear path of the one or more luminous or light emitting surfaces of the annular-shaped output aperture 332 along their respective lengths. Note that, here, the LAE 350 is also annular shaped and surrounds or encloses the output aperture 332. For instance, in some implementations, the luminaire 300 can include a trim arranged to surround or enclose the annular-shaped output aperture 332 in an installed configuration of the luminaire 300. In such implementations, the trim can include the annular-shaped LAE 350.

FIG. 3B shows that the annular-shaped LAE 350 is offset from the annular-shaped output aperture 332 along the z-axis by an axial offset Δ. FIGS. 3B-3C also show that the annular-shaped LAE 350 has a width W in the (x,y)-plane, and is offset radially from the annular-shaped output aperture 332 by a radial offset δ. As noted above, the width T of the annular-shaped output aperture 332 is configured to be smaller, or much smaller than the width W of the annular-shaped LAE 350.

In some implementations, the luminaire 300 can be modified to obtain a luminaire in which the LAE 350 extends along a closed curvilinear path that surrounds or encloses an output aperture that extends along a polygonal path, e.g., a rectangular-, hexagonal-, octagonal-, etc., perimeter, in which each side of the polygon is formed by a straight path portion of the output aperture. In other implementations, the luminaire 300 can be modified to obtain a luminaire in which an LAE extends along a polygonal path that surrounds or encloses the annular-shaped output aperture 332. In yet other implementations, the luminaire 300 can be modified to obtain a luminaire in which an LAE surrounds or encloses an output aperture, and both the LAE and the output aperture extend along respective polygonal paths.

Figure 4:
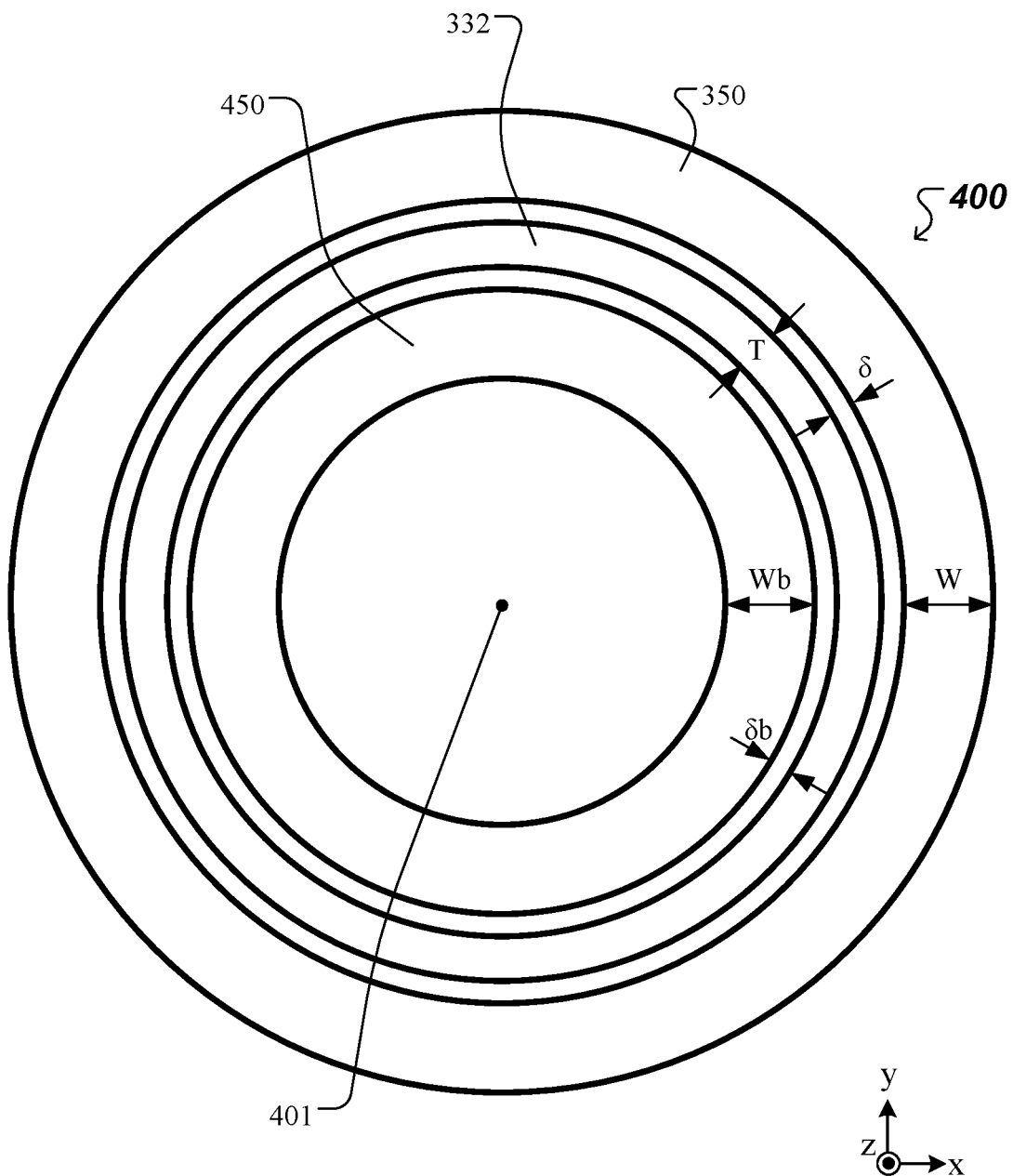
FIG. 4 illustrates a schematic sectional view of a fourth example of a luminaire having two LAEs.

The luminaire 300 can be modified to obtain a luminaire that has an inner LAE disposed such that the annular-shaped output aperture 332 surrounds or encloses the inner LAE. FIG. 4 illustrates a bottom view of such a luminaire 400 configured like the luminaire 300 and having an additional annular-shaped LAE 450. The luminaire 400 has an optical axis 401. As described above, the outer annular-shaped LAE 350 has a width W, surrounds or encloses the annular-shaped output aperture 332, and is radially offset therefrom by a radial offset δ. The inner annular-shaped LAE 450 has a width Wb. Moreover, the annular-shaped output aperture 332 has a width T and surrounds or encloses the inner annular-shaped LAE 450. Here, the annular-shaped output aperture 332 is radially offset from the inner annular-shaped LAE 450 by another radial offset δb.

In some implementations, the inner annular-shaped LAE 450 can be disposed coplanar with the outer annular-shaped LAE 350, i.e., can have the same axial offset Δ relative to the annular-shaped output aperture 332 as the outer annular-shaped LAE 350. In other implementations, the inner annular-shaped LAE 450 can have an axial offset relative to the annular-shaped output aperture 332 different from A.

Figure 5:
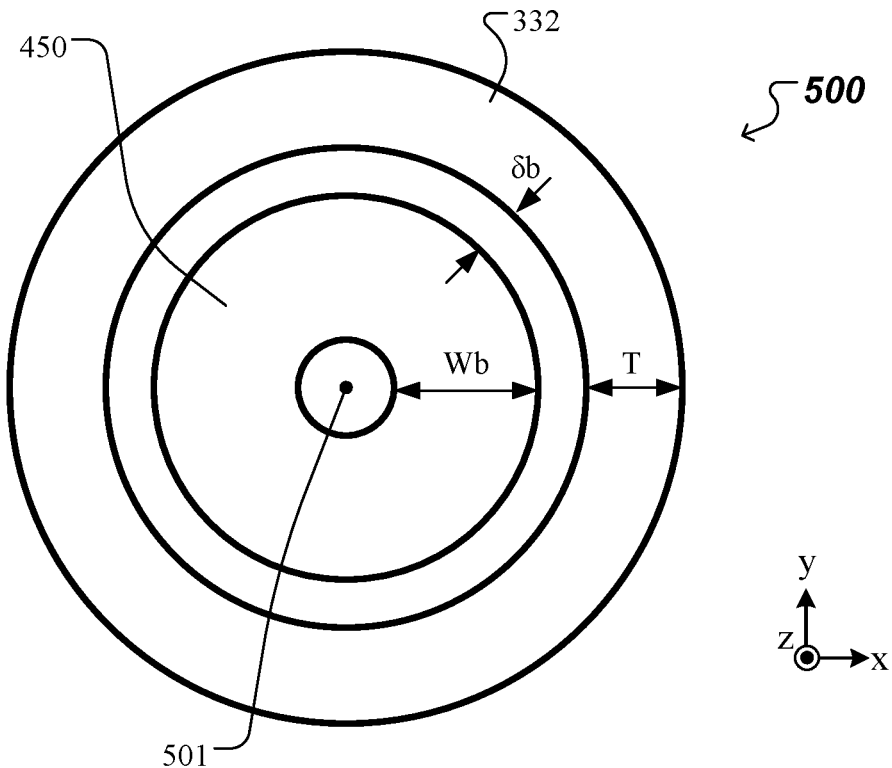
FIG. 5 illustrates a schematic sectional view of a fifth example of a luminaire having a LAE.

The luminaire 400 can in turn be modified to obtain a luminaire that only has the inner annular-shaped LAE 450 disposed such that the annular-shaped output aperture 332 surrounds or encloses the inner annular-shaped LAE 450. FIG. 5 illustrates a bottom view of such a luminaire 500 configured like the luminaire 400 but without an outer annular-shaped LAE. The luminaire 500 has an optical axis 501. As described above, the inner annular-shaped LAE 450 has a width Wb. Moreover, the annular-shaped output aperture 332 has a width T and surrounds or encloses the inner annular-shaped LAE 450. Here, the annular-shaped output aperture 332 is radially offset from the inner annular-shaped LAE 450 by a radial offset δb.

Figure 6:
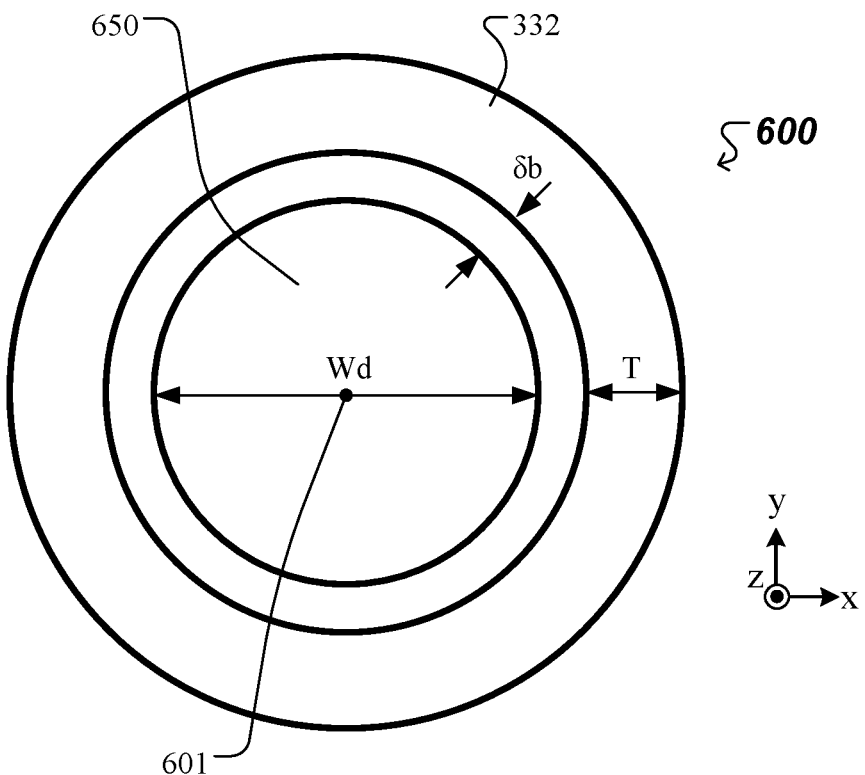
FIG. 6 illustrates a schematic sectional view of a sixth example of a luminaire having a LAE.

The luminaire 500 can in turn be modified to obtain a luminaire that only has an inner disk-shaped LAE disposed such that the annular-shaped output aperture 332 surrounds or encloses the inner disk-shaped LAE. FIG. 6 illustrates a bottom view of such a luminaire 600 configured like the luminaire 500 in which the inner annular-shaped LAE 450 was replaced by an inner disk-shaped LAE 650. The luminaire 600 has an optical axis 601. The inner disk-shaped LAE 650 has a disk shape. In the example shown in FIG. 6, the disk is circular and has a diameter Wd. Moreover, the annular-shaped output aperture 332 has a width T and surrounds or encloses the inner disk-shaped LAE 650. Here, the annular-shaped output aperture 332 is radially offset from the inner disk-shaped LAE 650 by a radial offset δb.

Figure 7A:
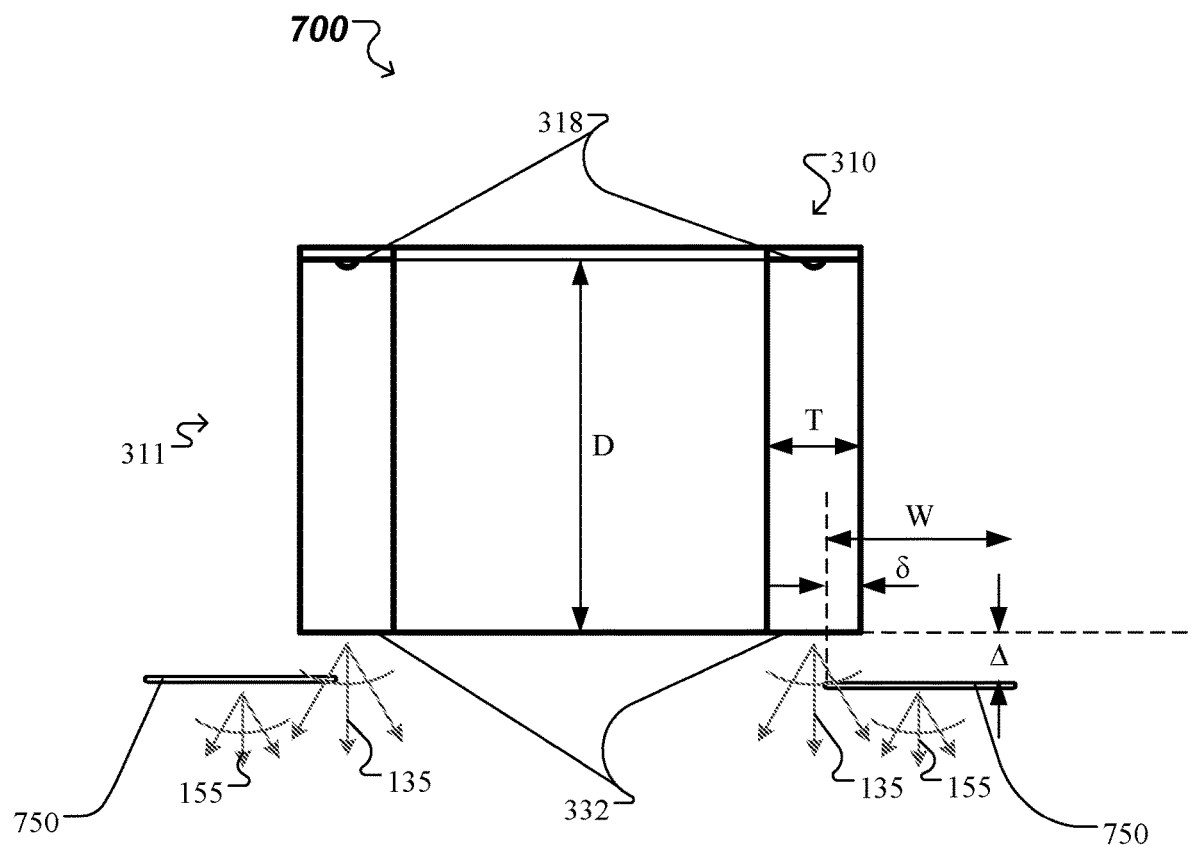
FIGS. 7A-7B illustrate aspects of a seventh example of a luminaire having a LAE.
Figure 7B:
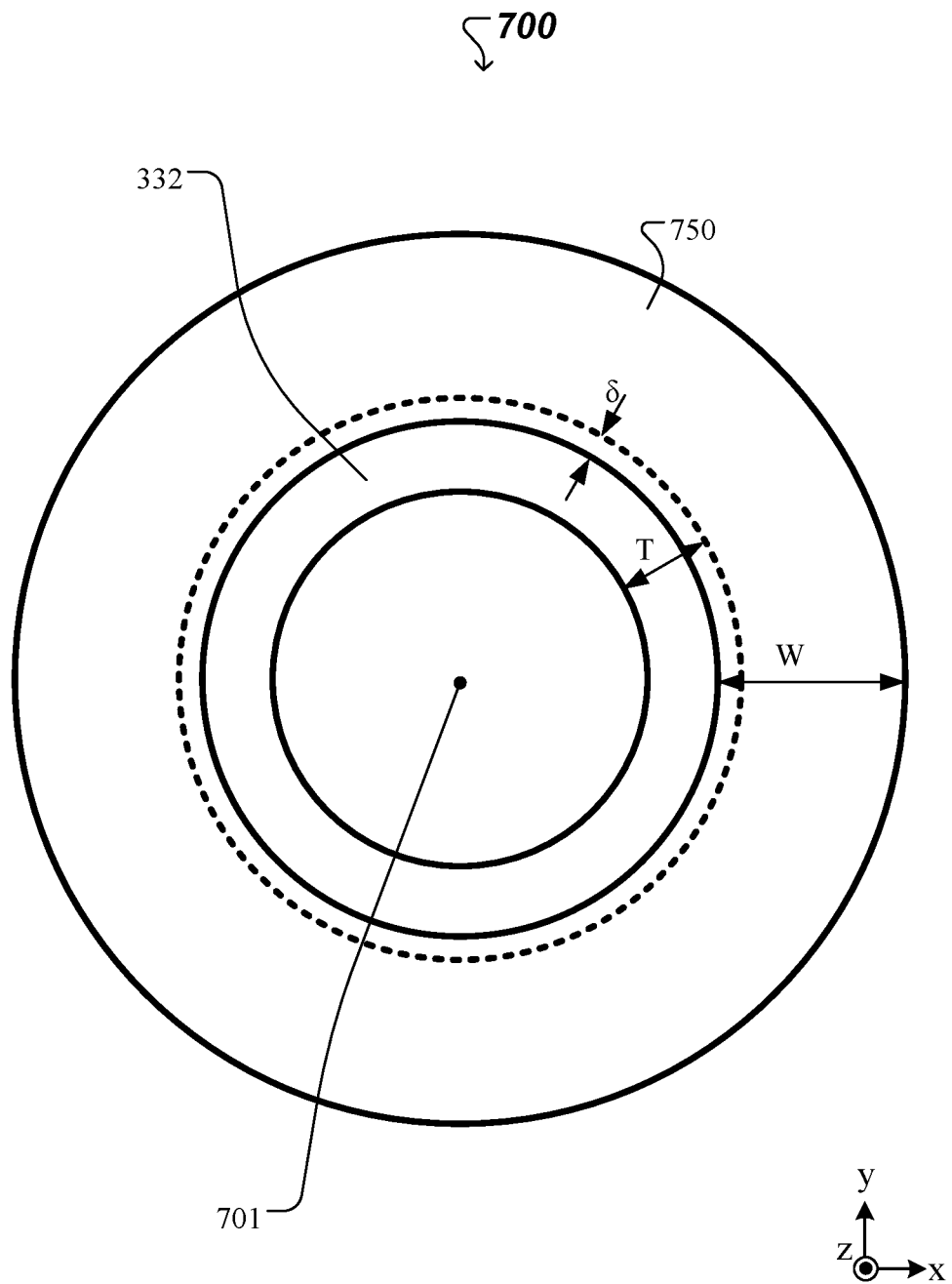

FIGS. 7A and 7B are a side view and a bottom view, respectively, of another luminaire 700 having a LAE 750. The luminaire 700 has a tubular configuration like the luminaire 300. As such, the luminaire 700 has an optical axis 701 parallel to the forward direction.

The luminaire 700 can be implemented to include the same annular-shaped primary source 310 and a tubular optical system 311 arranged and configured like in the luminaire 300. As described above in connection with FIGS. 3A-3C, the optical system 311 is configured to receive light produced by the primary source 310, to steer the received light in the forward direction, here along the z-axis, and output the steered light in the output angular range 135 along the z-axis.

Generally, the LAE can be implemented as a passive LAE without its own light source or an active LAE including a secondary light source separate from the primary light source or a combination of both. Passive LAEs can include random, or engineered diffusive layers that are adequately transparent to light output by the optical system 311. For instance, the diffusive layer can be formed from a matrix of elastic, quasi-elastic, or inelastic scattering centers. Passive and active LAEs may be static or dynamically controllable during operation. Dynamically controllably LAEs may be provided with liquid crystals, electrowetting or other layers. Active LAEs may be translucent or transparent.

In the luminaire 700, the LAE 750 is annular shaped and optically coupled with the tubular optical system 311 to receive light from the primary light source 310. As shown in FIG. 7A, the annular-shaped LAE 750 is offset from the annular-shaped output aperture 332 along the z-axis, by an axial offset Δ, to receive some light output from the annular-shaped output aperture 332. And, as shown in FIGS. 7A-7B, the annular-shaped LAE 750 only partially surrounds or partially encloses the footprint of the annular-shaped output aperture 332. I.e., the annular-shaped LAE 750 has a width W and overlaps radially the footprint of the annular-shaped output aperture 732, by a radial overlap δ, to receive some light output from the output aperture 732. Note that the overlap δ is a fraction of the width T of the annular-shaped output aperture 332, e.g., δ=0.1, 0.2, 0.3, or 0.5×T.

A passive LAE 750 can redistribute the received light into light provided in the areal angular range 155 along the z-axis. A transparent active LAE 750 may simply transmit such received light while providing its own light. A far-field intensity distribution of the light output by (a cross-section along the (x,z)-plane of) the luminaire 700 in the output angular range 135 and the areal angular range 155 has corresponding overlapping lobes that are similar to the lobes 193 and 195a shown in FIG. 1B.

While an LAE can be arranged in planes parallel to the output aperture of the luminaire's optical system, in some implementations, the LAE(s) of a luminaire can be arranged in planes tilted relative to the output aperture so long as the intensity-distribution lobes corresponding to light output by the optical system and light output by the LAE(s) overlap. Moreover, the LAE(s) of each luminaire described above was/were secured at a desired position relative to the output aperture either by suspending the LAE(s) through cables, or by implementing the LAE(s) as a trim supported by a ceiling. A luminaire described below includes one or more LAEs that are arranged along a surface of the luminaire other than its output aperture, and thus the LAEs are arranged in planes that are closer to being orthogonal, rather than parallel, to the optical aperture.

Figure 8A:
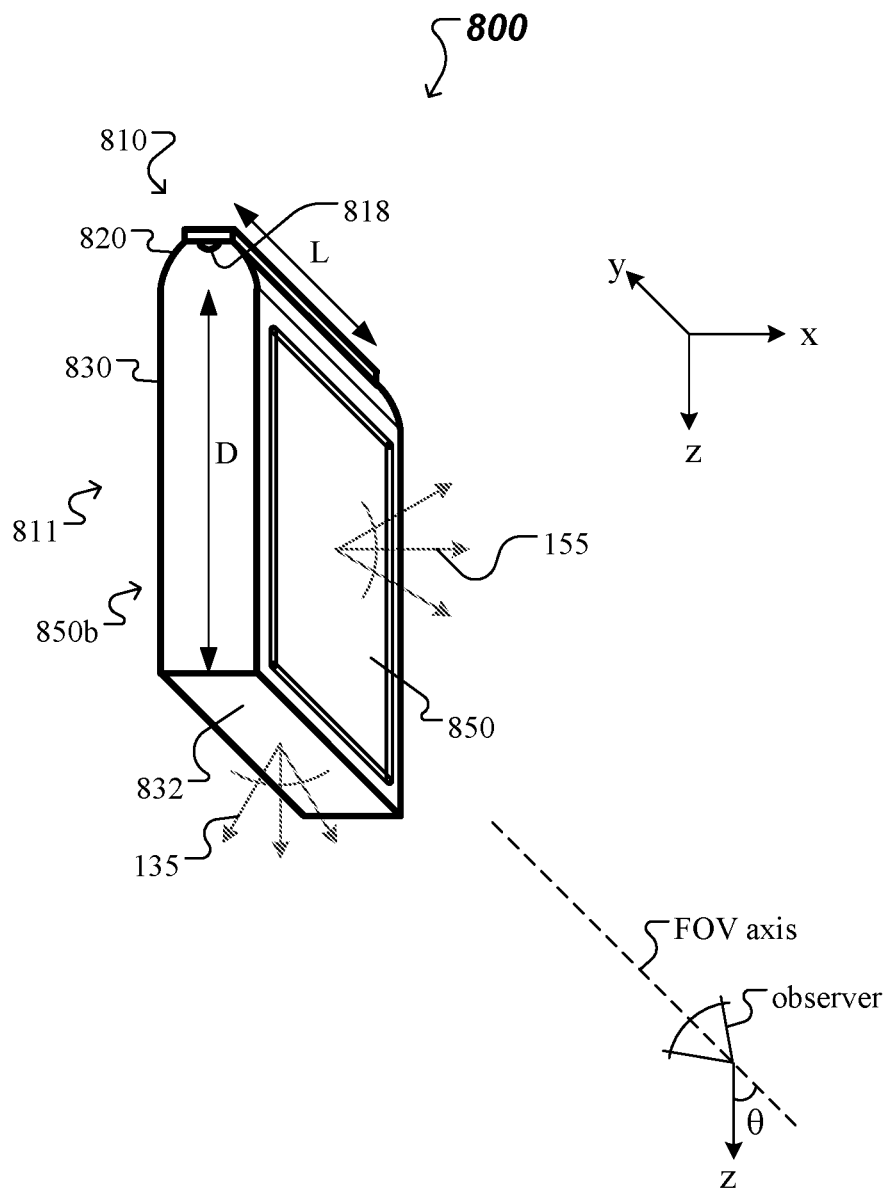
FIGS. 8A-8B illustrate aspects of an eighth example of a luminaire having one or more LAEs.

FIG. 8A is a perspective view of a luminaire 800 having an optical system 811 with an output aperture 832, and an LAE 850 arranged along a surface of the luminaire 800 other than the output aperture 832. Additional LAEs may be disposed elsewhere along the luminaire. For example, an additional LAE 850b can be disposed on the opposite side of the light guide 830 relative to the LAE 850. The luminaire 800 is elongated along a direction orthogonal to a forward direction. Here, the forward direction is along the z-axis, and the orthogonal direction is along the y-axis.

The luminaire 800 can be implemented in manner similar to the luminaire 100 described above. For instance, the luminaire 800 includes a primary source 810 and an optical system 811 optically coupled with the primary source 810. Here, the optical system 811 has an input aperture 818 (e.g., formed from one or more input surfaces or edges) and an output aperture 832 (e.g., formed from one or more output surfaces or edges) and is arranged and configured to steer light received from the primary source 810 along the z-axis. The primary source 810 can be implemented in a manner similar to the primary source 110, and the optical system 811 can be implemented in a manner similar to the optical system 111.

In the example illustrated in FIG. 8A, the optical system 811 includes an optical coupler 820 optically coupled with the primary source 810. Here, the input aperture of the optical coupler 820 is the input aperture 818 of the optical system 811. The optical system 811 also includes a light guide 830 having input and output ends separated along the z-axis by a distance D. The input end of the light guide 830 is optically coupled with the optical coupler 820. The output end of the light guide 830 is the output aperture 832 of the optical system 811. A thickness of the light guide 830, and therefore a width of the output aperture 832 in the (x,y)-plane, is T. In this example, the output aperture 832 extends along a linear path of length L along the y-axis. The combination of optical components 818, 820, 830, 832 of the optical system 811 is configured such that the optical system 811 outputs light in an output angular range 135 along the z-axis.

The LAE 850 can be implemented as either the light sheet 950 or the LAE 1050 and is arranged along a side surface of the light guide 830. In some implementations, an area of the LAE 850 can substantially match the entire area D×L of the side surface of the light guide 830. In other implementations, the LAE 850's area can be 50%, 80%, 90% of the entire area of the side surface of the light guide 830. As described in connection with FIGS. 9-10, the LAE 850 can be configured to emit light along a direction orthogonal to its surface. In the example shown in FIG. 8A, since the side surface of the light guide 830 is arranged in the (y, z)-plane, the LAE 850 emits light in an areal angular range 155 parallel to the x-axis.

In some implementations, when the luminaire 800 includes a second LAE 850b, the second LAE 850b can be implemented in a manner similar to the LAE 850, except it can be arranged along the opposing side surface of the light guide 830 to emit light in a second areal angular range antiparallel to the x-axis.

Figure 8B:
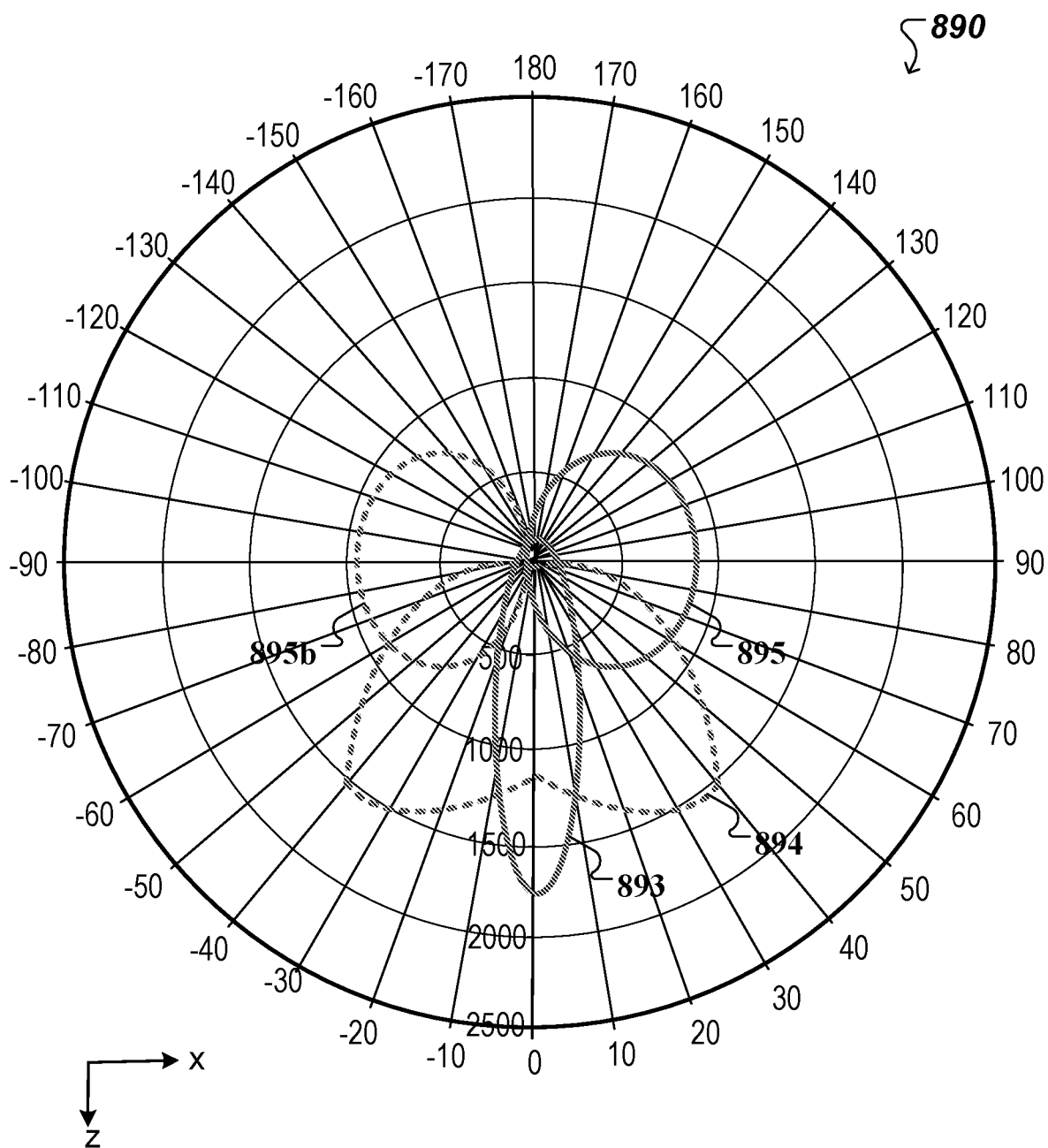

FIG. 8B shows a far-field intensity distribution 890 of light output by the luminaire 800. Here, lobe 893 represents the intensity of the light provided by the optical system 811 in the output angular range 135. By comparison, if an optical extractor (e.g., an optical extractor 140) is included, the lobe 893 may be replaced, for example, by lobe 894 representing the intensity of the light provided by the optical system 811 in a second output angular range (e.g., the second output angular range 145). Lobe 895 represents the intensity of the light provided by the LAE 850 in the areal angular range 155. The overlap between lobe 895 and lobe 893 causes reduction of contrast in luminance of the light distribution corresponding to the first (or second) output angular range and an ambient background surrounding the luminaire. In this manner, an observer looking at the luminaire 800 at an observation angle θ relative to the forward direction, as shown in FIG. 8A, will experience the noted contrast reduction if $10° <θ<30°$. This optimum angular observation range is suggested in FIG. 8B by the fact that the overlap of lobes 893, 895 is significant over directions which are oriented in the range of 10°-30° relative to the forward direction. Light from the lobe 895 that is directed upward can illuminate a surrounding ceiling or plenum of the luminaire and further improve visual comfort and contrast to an observer (e.g., by reducing glare). In other implementations, the LAE 850 may be configured to output light only within acute angles relative to the z-direction.

In implementations in which the luminaire 800 includes both LAEs 850, 850b, lobe 895b, shown in FIG. 8B, represents the far-field intensity distribution of the light provided by the second LAE in the second areal angular range. Note that in this example, the lobes 895 and 895b are oriented in opposing directions and each has similar overlap with the lobe 893, except the two overlapping ranges are mirror symmetric relative to the forward direction. Hence, in implementations in which the luminaire 800 includes both LAEs 850, 850b, an observer looking at the luminaire 800 at an observation angle θ relative to the forward direction, as shown in FIG. 8A, will experience the optimum contrast reduction if $-30°<θ<-10°$ and $10° <θ<30°$. As described above, one or more LAEs can be used in conjunction with a variety of different optical systems to distribute light. For example, one or more LAEs can be used in conjunction with optical systems having slab, tubular, and/or cylindrical light guides to provide light in a manner that reduces glare and improves visual comfort.

Unless defined otherwise, all technical and scientific terms used herein have the same meaning as commonly understood by one of ordinary skill in the art to which this technology belongs.

The invention claimed is:

1. A luminaire comprising:
a light source;
an optical system configured to receive light from the light source during operation of the luminaire and output the light received from the light source into a first far-field light distribution, the optical system comprising a cylindrical or tubular light guide extending along an axis arranged to direct light received from the light source at an input aperture of the optical system to an output aperture of the optical system, the light guide comprising one or more output surfaces at the output aperture through which light from the light source is emitted, the output surface having a first dimension, T, in a first radial direction; and
a luminous areal element (LAE) radially spaced from the output surface, the LAE being configured to output light from the light source during operation of the luminaire according to a second far-field light distribution, the LAE having a light emission surface with an extended surface area through which light from the light source is emitted having a second dimension, W, in the first radial direction,
wherein W>T and the first and the second far field light distributions at least in part overlap.

2. The luminaire of claim 1, wherein the output aperture extends along a first curvilinear path, and the LAE extends along a second curvilinear path that at least partially encloses the first curvilinear path.

3. The luminaire of claim 2, wherein the first curvilinear path is equally spaced from the second curvilinear path along their respective lengths.

4. The luminaire of claim 1, wherein the output aperture defines a first annular shape, and the LAE defines a second annular shape.

5. The luminaire of claim 1, wherein the one or more output surfaces at the output aperture and the light emission surface of the LAE are coplanar.

6. The luminaire of claim 1, wherein the one or more output surfaces at the output aperture and the light emission surface of the LAE are not coplanar.

7. The luminaire of claim 1, wherein the one or more output surfaces and the light emission surface of the LAE are planar surfaces that are parallel.

8. The luminaire of claim 1, wherein the one or more output surfaces at the output aperture is disposed on a first plane orthogonal to an axis extending between the input aperture and the output aperture, and the light emission surface of the LAE is angled relative to the first plane.

9. The luminaire of claim 8, wherein the light emission surface of the LAE is disposed in a second plane orthogonal to the first plane.

10. The luminaire of claim 1, wherein W is at least 2T.

11. The luminaire of claim 1, wherein the LAE is configured, during operation, to:
receive at least some of the light outputted from the output aperture, and
output at least some of the light received from the output aperture according to the second far-field light distribution.

12. The luminaire of claim 1, wherein the LAE comprises an additional light source, and
wherein the additional light source is configured, during operation, to provide at least some of the light output by the LAE according to the second light distribution.

13. The luminaire of claim 1, wherein the LAE comprises one or more light diffusing surfaces.

14. The luminaire of claim 1, wherein the LAE comprises:
a substrate, and
one or more additional light sources positioned on the substrate.

15. The luminaire of claim 14, wherein the one or more additional light sources comprise one or more light emitting diodes.

16. The luminaire of claim 1, further comprising an additional LAE spaced from the output aperture, wherein the output aperture at least in part encloses the second LAE.

17. The luminaire of claim 16, wherein the output aperture extends along a first curvilinear path, the LAE extends along a second curvilinear path, and the additional LAE extends along a third curvilinear path, wherein the second and the third curvilinear paths are equally spaced from the first curvilinear path along their respective lengths.

18. The luminaire of claim 16, wherein the output aperture defines a first annular shape, the LAE defines a second annular shape, and the additional LAE defines a third annular shape.

19. The luminaire of claim 1, wherein a first edge of the light guide defines the input aperture and a second edge of the light guide opposite the first edge defines the output aperture.

* * * * *